W. CRONK.
RAKE.
APPLICATION FILED FEB. 24, 1915.
1,190,734.
Patented July 11, 1916.
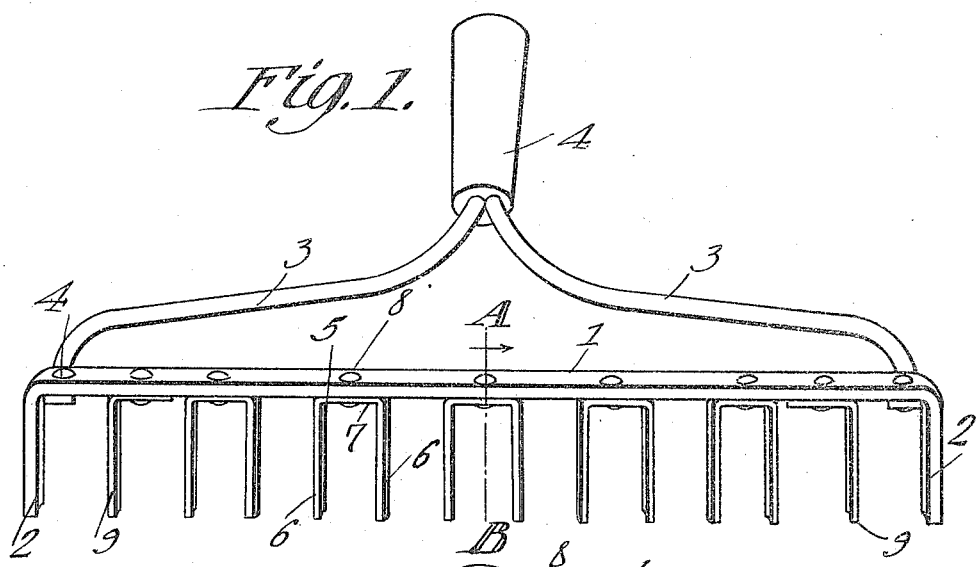
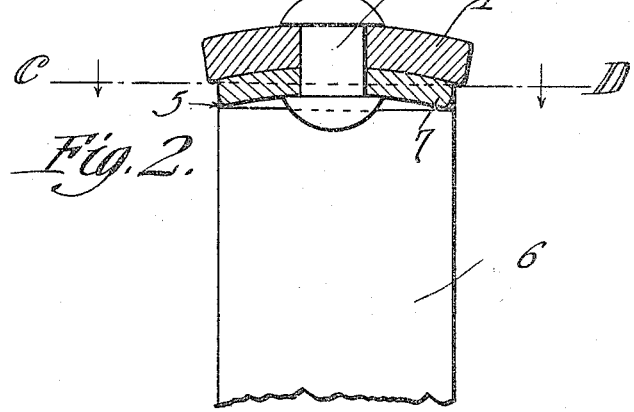
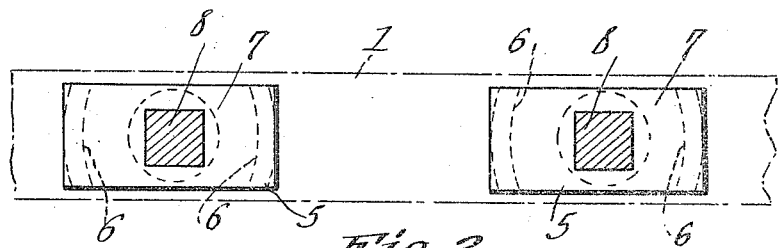
Witnesses
Inventor
W. Cronk
by
Attorneys

UNITED STATES PATENT OFFICE.

WILLIAM CRONK, OF MONTOUR FALLS, NEW YORK.

RAKE.

1,190,734.　　　　　Specification of Letters Patent.　　Patented July 11, 1916.

Application filed February 24, 1915. Serial No. 10,337.

*To all whom it may concern:*

Be it known that I, WILLIAM CRONK, a citizen of the United States, residing at Montour Falls, in the county of Schuyler and State of New York, have invented a new and useful Rake, of which the following is a specification.

This invention relates to hand rakes and its object is to provide a simple and durable rake, the teeth of which are assembled with the cross bar of the head of the rake in a simple and efficient manner so that they will not become displaced relative thereto.

A further object is to simplify the construction of the rake and at the same time strengthen it.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a perspective view of a rake embodying the present improvements. Fig. 2 is an enlarged section on line A—B Fig. 1. Fig. 3 is a section on line C—D Fig. 2.

Referring to the figures by characters of reference 1 designates the top strip of the rake head, the same being formed of metal slightly bowed transversely, as shown particularly in Fig. 2, the ends of the strip being downturned to form end teeth 2. Secured to the strip 1 close to the teeth 2 are the ends of rearwardly converging arms 3 connected to a handle 4. These arms can be secured to the strip 1 by rivets 4 or in any other suitable manner. Arranged under the strip 1 is a series of U-shaped members 5 each of which is preferably formed of a strip of metal slightly bowed transversely to form parallel teeth 6 and a crown portion 7, the straight front and back edges of the crown portion being clamped tightly against the concaved lower face of the strip 1 by a rivet 8 which is preferably angular in cross section as shown particularly in Fig. 3. As the longitudinal edges of the strip 1 project below the corresponding edges of the crown portions 7, it will be seen that they will prevent the members 5 from turning on their rivets. As a further means of preventing such rotation, the said rivets are made angular as before stated. By forming the teeth of strips which are bowed transversely, they are greatly stiffened and bending of the teeth is thus practically prevented. The use of a transversely bowed top strip 1 likewise stiffens the rake as will be obvious. Where single teeth are to be used, as shown for example at 9 in Fig. 1, it is merely necessary to cut off one of the teeth from a U-shaped member whereupon the single tooth can be secured as hereinbefore described. A transversely bowed top strip is advantageous as compared with a channel strip because less metal is required in its formation, this being a material item where large numbers of rakes are manufactured. Furthermore, the end portions of a bowed top strip can be downturned and used as end teeth without the necessity of reshaping them, as would be the case should the said top strip be made of an ordinary channeled member.

What is claimed is:—

A rake including a transversely bowed top strip having downturned terminals forming side teeth, transversely bowed metal strips bent to U-shape and having the crown portions seated snugly against the concave face of the top strip, the transversely concaved side portions of the U-shaped metal strips forming teeth, and a single angular fastening device extending through the crown portion of each U-shaped strip and through the top strip, each fastening device being separate from the U-shaped strip and the top strip and having its ends upset to bind the crown portion of the engaged U-shaped strip against the top strip, the contacting faces of the crown portion of the U-shaped strip and of the top strip coöperating to assist the fastening device in holding the U-shaped strip against displacement relative to the top strip.

In testimony that I claim the foregoing as my own, I have hereto affixed my signature in the presence of two witnesses.

WILLIAM CRONK.

Witnesses:
　C. B. CRONK,
　W. D. BOWLBY.

Copies of this patent may be obtained for five cents each, by addressing the "Commissioner of Patents, Washington, D. C."